US005732955A

United States Patent [19]
Skinner et al.

[11] Patent Number: 5,732,955
[45] Date of Patent: Mar. 31, 1998

[54] EXPANDABLE COMPRESSION RING

[75] Inventors: James W. Skinner; William O. Skinner; Fouad M. Deeb; Ronald W. Neuhaus, all of Fort Wayne; Michael R. Miller, Churubusco, all of Ind.

[73] Assignee: Press-Seal Gasket Corporation, Fort Wayne, Ind.

[21] Appl. No.: 681,067

[22] Filed: Jul. 22, 1996

Related U.S. Application Data

[63] Continuation of Ser. No. 400,188, Mar. 6, 1995, abandoned, which is a continuation of Ser. No. 30,816, Mar. 12, 1993, abandoned.

[51] Int. Cl.$^6$ ....................................................... F16J 15/00
[52] U.S. Cl. ........................... 277/101; 277/147; 277/156; 277/189; 285/370
[58] Field of Search ............................ 277/101, 138, 277/147, 154, 155, 156, 189; 285/237, 162, 921, 370

[56] References Cited

U.S. PATENT DOCUMENTS

| | | |
|---|---|---|
| 1,117,083 | 11/1914 | Patchell . |
| 1,172,369 | 2/1916 | Kottusch . |
| 1,211,692 | 1/1917 | Endebrock et al. . |
| 1,225,101 | 5/1917 | Ballmer . |
| 1,274,038 | 7/1918 | Hilker . |
| 1,359,596 | 11/1920 | Hill . |
| 1,768,392 | 6/1930 | Benien . |
| 3,101,743 | 8/1963 | Hoke . |
| 3,141,687 | 7/1964 | Broberg et al. . |
| 3,293,978 | 12/1966 | Handley . |
| 3,406,988 | 10/1968 | Jones . |
| 3,449,916 | 6/1969 | Tabor . |
| 3,656,771 | 4/1972 | Stout . |
| 3,700,265 | 10/1972 | Dufour et al. . |
| 3,759,280 | 9/1973 | Swanson . |
| 3,808,937 | 5/1974 | Roehrig . |
| 3,813,116 | 5/1974 | Horsley . |
| 3,814,409 | 6/1974 | Prasse . |
| 3,866,925 | 2/1975 | Maimstrom et al. . |
| 3,958,313 | 5/1976 | Rossborough . |
| 3,960,395 | 6/1976 | Cirule et al. . |
| 3,973,783 | 8/1976 | Skinner et al. . |
| 4,017,089 | 4/1977 | Kurata et al. . |
| 4,103,901 | 8/1978 | Ditcher . |

(List continued on next page.)

FOREIGN PATENT DOCUMENTS

| | | |
|---|---|---|
| 0021454 | 1/1981 | European Pat. Off. .............. 277/101 |
| 2 293 858 | 2/1976 | France . |
| 476019 | 11/1937 | United Kingdom . |
| 1 526 123 | 9/1978 | United Kingdom . |

Primary Examiner—Daniel G. DePumpo
Attorney, Agent, or Firm—Barnes & Thornburg

[57] ABSTRACT

An integrally molded compression ring for exerting an outwardly, radially directed force on an inner surface of a gasket to compress the gasket into sealing engagement with a wall of an opening. The compression ring is made from a one-piece body or strip of resiliently flexible material that has a substantially continuous and uninterrupted exterior circumferential surface. Lugs formed on an interior portion of the strip cooperate with a force expansion unit to move the ring into an expanded position. A recess may also be provided in one end of the strip for cooperating with the force expansion unit. Projections integrally molded on an interior portion of the strip and on an exterior portion adjacent an end of the strip engage one another to lock the ring in an expanded position. Guiding structure may be formed on the strip that prevent lateral movement of the ends of the strip relative to one another when the strip is formed into a ring. The end of the strip and a portion adjacent thereto that overlap the other end of the strip when it is formed into a ring taper to a featheredge. The ring may be formed so as to be expandable into multiple locked positions. An alternative embodiment of the compression ring has integrally molded first and second portions. Distal ends of the second portion may also taper to a featheredge. This ring may also be formed so as to be expandable into multiple locked positions.

45 Claims, 2 Drawing Sheets

U.S. PATENT DOCUMENTS

| | | |
|---|---|---|
| 4,191,390 | 3/1980 | Wolf et al. . |
| 4,203,190 | 5/1980 | Temple et al. . |
| 4,215,868 | 8/1980 | Skinner et al. . |
| 4,242,164 | 12/1980 | Skinner . |
| 4,281,944 | 8/1981 | Bowman . |
| 4,387,900 | 6/1983 | Ditcher et al. . |
| 4,466,219 | 8/1984 | Campolito . |
| 4,478,437 | 10/1984 | Skinner . |
| 4,582,450 | 4/1986 | Neil . |
| 4,702,645 | 10/1987 | Skinner et al. . |
| 4,711,455 | 12/1987 | Ditcher et al. . |
| 4,746,127 | 5/1988 | Westhoff et al. . |
| 4,864,684 | 9/1989 | Gellenthin, Jr. . |
| 4,890,863 | 1/1990 | Westhoff et al. . |
| 4,903,970 | 2/1990 | Ditcher et al. . |
| 5,029,907 | 7/1991 | Gundy . |
| 5,042,532 | 8/1991 | Gilleland . |
| 5,054,794 | 10/1991 | Westhoff et al. . |
| 5,150,927 | 9/1992 | Skinner . |
| 5,213,341 | 5/1993 | Griffiths . |
| 5,507,500 | 4/1996 | Skinner et al. ............ 277/199 |

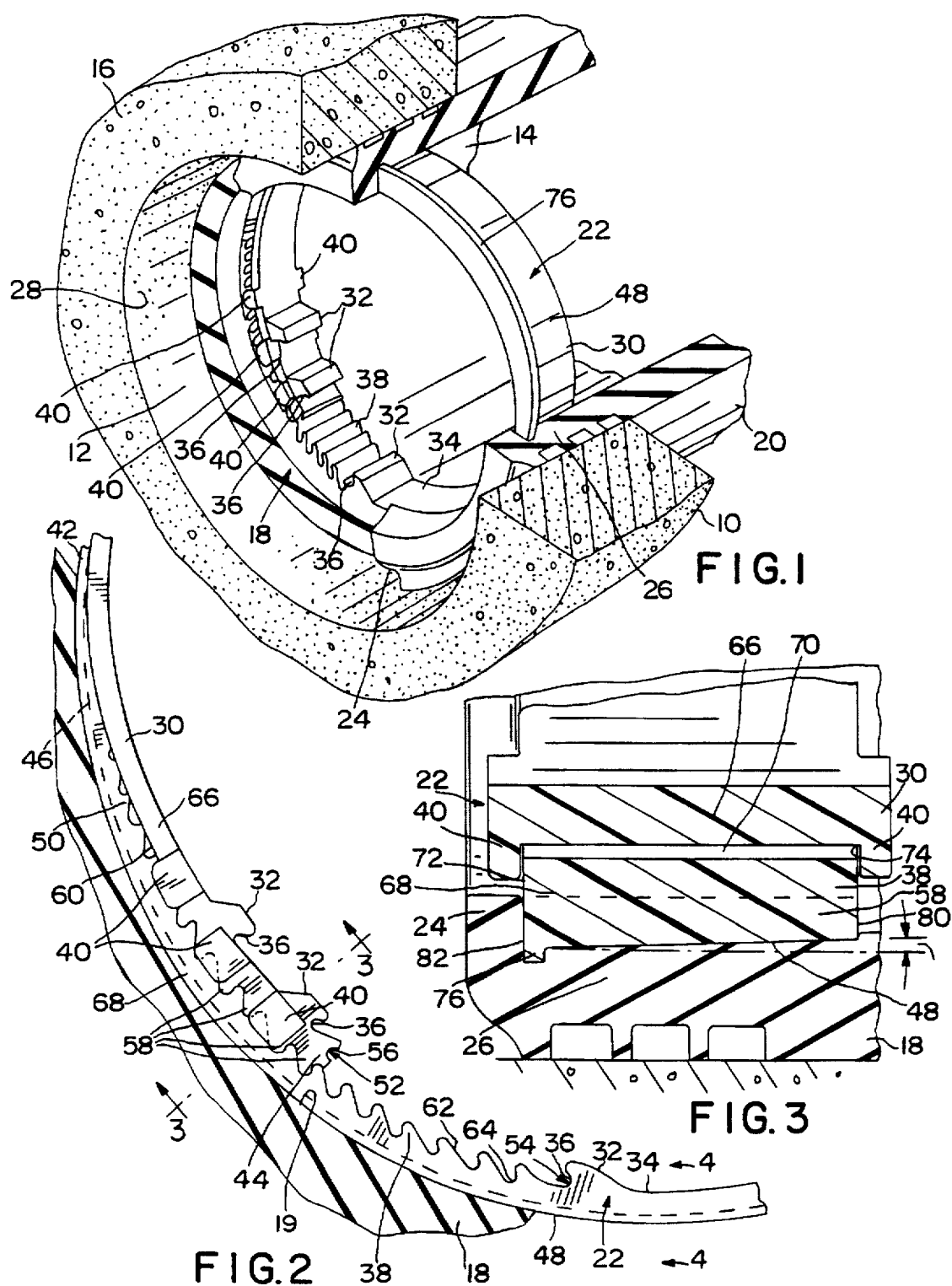

5,732,955

EXPANDABLE COMPRESSION RING

This is a Continuation of application Ser. No. 08/400,188, filed Mar. 6, 1995, now abandoned which is a Continuation of application Ser. No. 08/030,816 filed Mar. 12, 1993, now abandoned.

BACKGROUND AND SUMMARY OF THE INVENTION

The present invention relates to an expandable seal arrangement. More particularly, the present invention relates to an expandable compression ring for exerting an outwardly, radially directed force on an inner surface of a gasket to compress said gasket into sealing arrangement with a wall of an opening.

Compressing rings may be used to clamp an exterior surface of a resilient gasket surrounding a pipe into an opening in which the pipe is inserted. The gasket used is typically constructed of an elastomeric material and, when clamped into position, provides a fluid-tight seal between the pipe and the opening. Clamping is accomplished by expanding the compression ring against the interior surface of the gasket.

Several designs for clamping bands exist. For example, U.S. Pat. No. 5,054,794 to Westhoff et al. discloses an expansion ring formed from a C-shaped annular, metal band and a generally S-shaped spanning member. The C-shaped annular band has a circumference of less than 360° such that a gap exists between first and second ends of the annular band. The annular band also has a generally U-shaped channel into which the spanning member is disposed. A first end of the spanning member is welded into the generally U-shaped channel of the annular band. A second end of the spanning member has a locking tongue formed thereon that engages a locking member welded in the U-shaped channel of the annular band. A guide member is also welded in the U-shaped channel of the annular band and holds the spanning member therein. At least two disadvantages exist with the design of Westhoff et al. The first is that the gap between the first and second ends of the annular band presents a discontinuity to the inner surface of the gasket in which it is disposed. During expansion of the ring of Westhoff et. al., this circumferential discontinuity will result in a non-uniform pressure surface area being exerted on the inner surface of the gasket. Westhoff et al. also suffers from the disadvantage that it is formed from multiple pieces of metal that require numerous welding operations for assembly.

Another example is U.S. Pat. No. 4,478,437 which is assigned to the assignee of the present invention. This patent discloses a radially expandable locking sleeve preferably formed of a flat steel strip of substantially uniform thickness. The sleeve is formed in an annular shape and has interlocking end portions. The ends portions lock the sleeve into a single expanded position. The outer circumferential surface of the locking sleeve presents a substantially uninterrupted pressure surface to the gasket, including across the interlocking ends portions.

A further example is U.S. Pat. No. 5,150,927, also assigned to the assignee of the present invention. This patent discloses a sliding sleeve and a radially expandable compression sleeve. The sliding sleeve is positioned adjacent the portion of the inner surface of the gasket to be expanded. The compression sleeve is disposed immediately adjacent the sliding sleeve which serves as a slip plate during expansion of the compression sleeve. The sliding sleeve may be attached to or integrally molded into the inner surface of the tubular gasket. The compression sleeve may be a one- or two-piece assembly that is expandable into multiple locked positions. Locking is accomplished via engagement of radially inwardly and outwardly facing teeth. The inwardly facing teeth are received in well-shaped tooth receiving recesses.

Applicant makes no representation by this discussion, nor should any such representation be inferred, that an exhaustive search of all relevant prior art has been conducted, or that no more pertinent prior art exists.

The arrangements described in U.S. Pat. Nos. 4,478,437 and 5,150,927 work well for their intended purpose. Each has its own advantages and a design that incorporated these advantages as well as providing additional ones would be a welcome improvement. Accordingly, a compression ring for exerting an outwardly, radially directed force on an inner surface of a gasket to compress the gasket into sealing engagement with a wall of an opening is provided. The subject invention has an integrally molded one-piece body or strip of resiliently flexible material. The body or strip has a substantially continuous and uninterrupted exterior circumferential surface. This exterior surface exerts a generally uniform pressure on an inner surface of the gasket. The strip has first and second ends. The first end overlaps the second end when the strip or body is formed into a ring. Integrally molded means on the body or strip cooperate with force exerting means to move the body or strip into an expanded position. In addition, means integrally molded on the body or strip lock the same into the expanded position. In preferred embodiments, the ring is integrally formed from plastic. The first end of the body or strip and a portion adjacent thereto may taper to a featheredge so as to provide the substantially continuous and uninterrupted circumferential surface. The cooperating means may comprise one or more lugs on a surface of the body or strip, for example, the interior surface of the body or strip. The cooperating means may further comprise holding means on the second end of the body or strip. The holding means may be a recess formed in the second end.

The locking means may comprise integrally molded cooperating projections on separate portions of the strip or body. The projections may be teeth-like structures a set of which are on an interior portion of the body or strip and a set of which are on an exterior portion of the body or strip adjacent the second end thereof. The teeth on one portion of the body or strip may be angled in a first direction and the teeth on the other portion of the body or strip may be angled in a second direction opposite the first direction.

The ring may further comprise guide means for limiting lateral movement of the first and second ends of the body or strip relative to one another. The guide means may comprise at least two opposing tabs on an exterior surface of the body or strip.

The compression ring may further include anchoring means integrally molded on the body or strip for securing the same against lateral movement in the gasket. The anchoring means may circumferentially extend around at least a portion of an exterior surface of the body or strip. The anchoring means may be a generally continuous protrusion that extends substantially orthogonally from the exterior surface of the body or strip.

The ring may be formed so that the body or strip thereof is expandable into multiple locked positions.

In another embodiment of the present invention, the compression ring comprises integrally molded first and second portions made from resiliently flexible material. In preferred embodiments, the ring is integrally formed from plastic. Means integrally molded on the first portion for cooperating with the force exerting means for moving the body into an expanded position is also provided. In addition, means for locking the first and second portions together to form the ring so that exterior surfaces of the first and second portions form a substantially continuous and uninterrupted circumferential surface is also provided. The locking means is integrally molded on the first and second portions. The exterior surface of the compression ring exerts a generally uniform pressure on the inner surface of the gasket. The first and second ends of the second portion and portions adjacent thereto may taper to a featheredge so as to provide the substantially continuous and uninterrupted circumferential surface.

The cooperating means may comprise holding means on first and second ends of the first portion. The holding means may comprise lugs. Alternatively, the holding means may be recesses formed in the first and second ends.

The locking means may comprise integrally molded projections on an exterior surface of the first portion and an interior surface of the second portion. The projections may be teeth-like structure. Groups of the teeth of the first portion may be angled in a first direction and groups of the teeth of a second portion may be angled in a second direction opposite the first direction.

The compression ring may further comprise anchoring means for securing the ring against lateral movement in the gasket.

The ring may be formed so as to be expandable into multiple locked positions.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective, partially cut-away and sectioned view of a seal installation constructed in accordance with the present invention.

FIG. 2 is a side elevational view of a portion of a compression ring and seal shown in FIG. 1.

FIG. 3 is a sectional view taken along line 3—3 of FIG. 2.

DETAILED DESCRIPTION OF THE DRAWINGS

Figure 5:
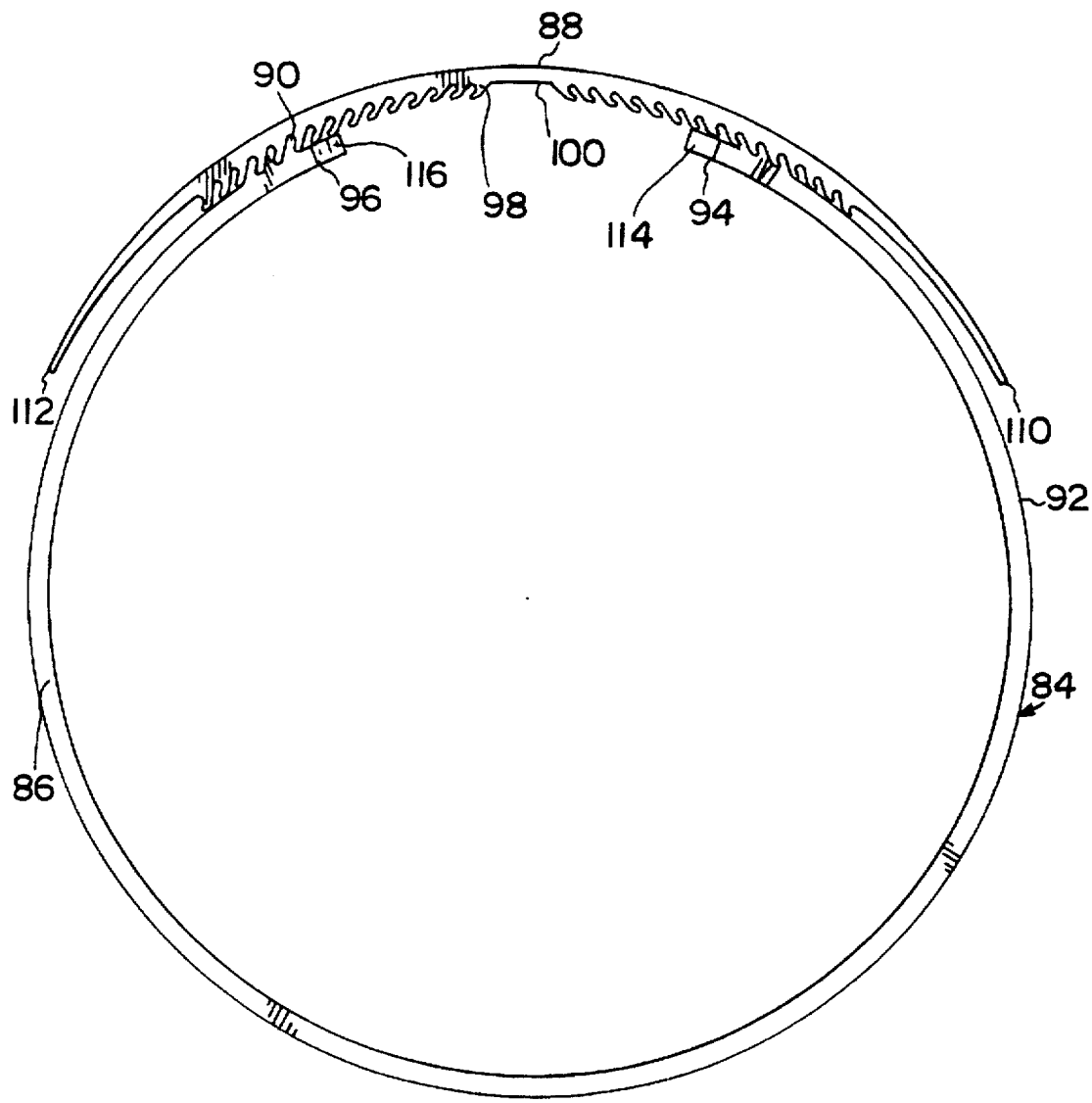
FIG. 5 is a side elevational view of an alternative embodiment of a compression ring of the present invention.

FIG. 1 shows a cut-away portion of a concrete manhole riser or monolithic base 10 which has a pipe-receiving opening 12 in a sidewall thereof. A pipe 14 (a portion of which is shown) is received within opening 12 and extends to a position beyond inner surface 16 of manhole riser or base 10. A gasket 18 is used to seal pipe 14 within opening 12. Gasket 18 has an elongate sleeve portion 20 and is preferably constructed of resilient, elastomeric material, such as rubber, neoprene, or a suitable plastic. Gasket 18 is intended to effect a fluid-tight seal between manhole riser or base 10 and pipe 14 received in opening 12 thereof. A compression ring 22 is coaxially received within a surface of gasket 18. Compression ring 22 abuts raised portion 24 of gasket 18. Compression ring 22 is radially expandable into multiple locked positions. When compression ring 22 is locked into an expanded position, portion 26 of gasket 18 is sealingly compressed against the wall 28 of opening 12 so as to effect the above-described fluid-tight seal.

Clamping ring 22 is a one-piece strip 30 of resiliently flexible material made from plastic or equivalent material. Compression ring 22 includes lugs 32 integrally formed or molded on an interior surface 34 of clamping ring 22. Lugs 32 cooperate with an expansion unit (not shown), a portion of which mounts on lugs 32 and exerts forces thereon to expand clamping ring 22 into a locked position. Lugs 32 have notches 36 formed therein that receive end portions (not shown) of the expansion unit. Teeth-like projections 38 and tabs 40 are also shown in FIG. 1. Both projections 38 and tabs 40 are integrally formed or molded on strip 30. The purpose and function of projections 38 and tabs 40 is described below with reference to FIG. 2.

FIG. 2 shows a portion of compression ring 22 in gasket 18. Strip 30 is shown with a first end 42 overlapping a second end 44. As can be seen, first end 42 and a portion 46 adjacent thereto taper to a featheredge. The tapering of first end 42 and portion 46 provides compression ring 22 with a substantially continuous and uninterrupted exterior circumferential surface 48 (see FIG. 1). This allows compression ring 22 to exert a generally uniform pressure on inner surface 19 of gasket 18 so as to effect a uniform seal between manhole riser or base 10 and gasket 18. Projections 50 are shown extending part of the length of portion 46. Projections 50 increase in height in a direction away from first end 42 until terminating adjacent projections 38. Projections 50 provide strength reinforcement to feathered portion 46 and first end 42 when the second end 44 overlaps first end 42 and compression ring 22 is expanded. Such reinforcement is desirable because feathered portion 46 and first end 42 are necessarily thinner than the remainder of strip 30 and thus have less structural integrity to withstand expansion forces. However, it should be noted that projections 50 are optional and not necessary for the operation of compression ring 22.

Lines 52 and 54 shown in FIG. 2 are intended to represent force vectors provided by an expansion unit (not shown) that expands compression ring 22 into a locked position. As can be seen in FIG. 2, the force vector represented by line 52 is acting on recess 56 formed in second end 44 of strip 30. As can also be seen from FIG. 2, the force vector represented by line 52 acts in a direction generally parallel to the longitudinal length of strip 30. Having the force vector act on recess 56 rather than on one of the lugs 32 thus maximizes the force applied by an expansion unit when expanding compression ring 22 into a locked position. That is, when one of the lugs 32 is used as a mount for an end portion of an expansion unit only a fraction of the force exerted by the expansion unit goes to expanding the compression ring because the force is acting at an angle between zero and ninety degrees relative to the longitudinal axis of strip 30. However, it should be noted that recess 56 is optional and not necessary for the operation of compression ring 22. It should also be noted that even if recess 56 is used, at least one lug 32 at or near second end 44 is necessary in order to release compression ring 22 from an expanded position.

Compression ring 22 is locked into one of a plurality of possible expanded positions via cooperative engagement of teeth-like projections 38 formed on an interior surface 34 of strip 30 with teeth-like projections 58 formed on the portion 60 of strip 30 near second end 44. As can be seen, projections 38 angle in a first direction and projections 58 angle in a second direction opposite that of the direction of projections 38. The angled orientation of projections 38 relative to projections 58 allows strip 30 to be radially expanded yet, at the same time, locks strip 30 in an expanded position so that it will not move in a direction toward the center of compression ring 22. That is, projections 38 provide ramped surfaces 62 over which projections 58 can travel during expansion of ring 22 and recessed cavities 64 into which projections 58 are disposedly engaged so as to prevent movement of strip 30 towards the center of compression ring 22. It should be noted that the projections 38 and 58 may be formed into shapes other than that shown in the drawings and still provide the above-described features associated with those shapes shown in the drawings. Such other shapes are within the scope and spirit of the present invention.

Tabs 40, formed or molded on both sides of inside portion 66 near second end 44 of strip 30, are designed to limit lateral movement of first and second ends 42 and 44 relative to one another. As can be seen in FIG. 3, tabs 40 downwardly extend over a part of outside portion 68 (which is also shown in FIG. 2) of strip 30. A channel 70 is formed between tabs 40 into which at least part of outside portion 68 extends. It should be noted that tabs 40 do not have to be parallel to one another on opposite sides 72 and 74 of inside portion 66 of strip 30. That is, tabs 40 may be diagonally spaced relative to one another on sides 72 and 74 of inside portion 66.

FIG. 3 shows anchoring structure 76 that circumferentially extends around a portion of exterior surface 48. Anchor structure 76 is shown as a lip or protrusion that extends substantially orthogonally from exterior surface 48 and engages a portion of gasket 18 so as to secure compression ring 22 against lateral movement therein. FIG. 1 shows anchoring structure 76 as being generally continuous. It is to be understood, however, that anchoring structure 76 may be formed so as to extend from exterior surface 48 at any angle other than ninety degrees and/or so as to be discontinuous. One possible such alternative structure would be a plurality of circumferentially extending barbs. It is also to be understood that anchoring structure 76 may consist of abrasively forming exterior surface 48 of compression ring 22 so that it allows expansion thereof but resists lateral movement. Such alternatives and others for anchoring structure 76 are still within the scope and spirit of the present invention. It is to be further understood that anchoring structure 76 is optional and unnecessary for the operation of compression ring 22.

Figure 4:
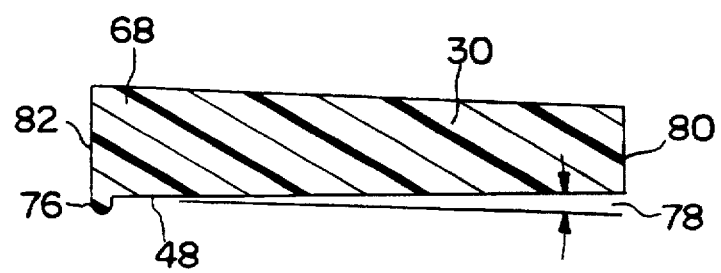
FIG. 4 is a sectional view taken along line 4—4 of FIG. 2.

FIGS. 3 and 4 also show angle 78 of inclination that exists between first edge 80 and second edge 82 along the width of strip 30. This angle of inclination is necessary in order to integrally form or mold compression ring 22 from plastic. That is, the cross-sectional thickness of strip 30 must increase from first edge 80 to second edge 82 in order to remove compression ring 22 from the mold in which it is formed after it has been made. Angle 78 is of known range in the art and has an approximate measure of two degrees.

There are several advantages to injection molding compression ring 22 from plastic, or an equivalent material. One of those advantages is that compression ring 22 can be entirely formed in a single operation. Multiple manufacturing steps are not necessary to construct compression ring 22. If a compression ring is formed from metal, then multiple forming and/or welding steps are necessary to construct a ring comparable to that of compression ring 22. For example, lugs 32 would need to be welded on. This means that a compression ring made from plastic can be manufactured quickly in a single step, rather than multiple steps. Another advantage of forming compression ring 22 from plastic is that it is less expensive to manufacture, requiring less labor and providing several material options. One material from the ring can be made is glass fiber filled nylon 6/6. Another acceptable material is glass fiber filled polypropylene. Other suitable thermoplastics may also be used.

FIG. 5 shows an alternative embodiment of compression ring 22 shown in FIGS. 1–4. However, as with compression ring 22, compression ring 84 shown in FIG. 5 is formed from plastic or an equivalent resiliently flexible material. Compression ring 84 has a C-shaped portion 86 and a separate locking portion 88. Sets of teeth-like projections 90 lie on the exterior surface 92 near distal ends 94 and 96 of C-shaped portion 86. Projections 90 engage teeth-like projections 98 formed on portions of interior surface 100 of locking portion 88. As can be seen, groups of projections 90 angle in a first direction and groups of projections 98 angle in a second direction opposite the first direction. Projections 90 and 98 cooperatively engage one another so as to lock compression ring 84 in a plurality of expanded positions. While projections 90 and 98 are shown as teeth-like structure, it is to be understood that other equivalent structure are within the scope and spirit of the present invention.

As can be seen in FIG. 5, distal ends 110 and 112 of locking portion 88 and portions adjacent thereto taper to a featheredge. This allows compression ring 84 to present a substantially continuous and uninterrupted exterior circumferential surface in inner surface 19 of gasket 18. Although not shown, as with compression ring 22, protrusions or other equivalent structure may be provided in the area of the feathered portions of locking portion 88 so as to provide strength reinforcement thereto.

Lugs 114 and 116 allow for attachment of a portion of an expansion unit (not shown) thereto so that compression ring 84 may be expanded and locked into position via locking portion 88. Lugs 114 and 116 also allow compression ring 84 to be released from an expanded position and removed from gasket. It should be noted that, although not shown, either or both lugs 114 and 116 could be replaced with recesses as described above with reference to compression ring 22.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. An apparatus for radially compressing a gasket into sealing engagement with a wall of an opening, comprising:
 a body having a uniform width and a flat exterior circumferential surface;
 means integrally molded on said body for cooperating with force exerting means for moving said body to an expanded position; and
 means integrally molded on said body and extending across the width thereof for locking said body in said expanded position, said locking means supporting said body so that said flat exterior circumferential surface adjacent the gasket exerts a substantially uniform, radially directed force on the entire inner surface of the gasket.

2. The apparatus of claim 1, wherein said body is made of plastic.

3. The apparatus of claim 1, wherein a first end of said body and a portion adjacent thereto taper to a featherededge so as to provide said substantially continuous and uninterrupted exterior circumferential surface.

4. The apparatus of claim 1, wherein said cooperating means comprises one or more lugs on a surface of said body.

5. The apparatus of claim 4, wherein said lugs are formed on an interior surface of said body.

6. The apparatus of claim 4, wherein said cooperating means further comprises means on said second end of said body for holding a portion of said force exerting means during movement of said body to said expanded position.

7. The apparatus of claim 6, wherein said holding means is a recess formed in said second end.

8. The apparatus of claim 1, wherein said locking means comprises integrally molded, cooperating projections on separate portions of said body.

9. The apparatus of claim 8, wherein said projections are teeth-like structures.

10. The apparatus of claim 1, further comprising guide means integrally molded to said body for limiting lateral movement of first and second ends of said body relative to one another.

11. The apparatus of claim 10, wherein said guide means comprises at least two opposing tabs on an exterior surface of said body.

12. The apparatus of claim 1, further comprising anchoring means integrally molded on said body for securing said body against lateral movement in said gasket.

13. The apparatus of claim 12, wherein said anchoring means circumferentially extends around at least a portion of an exterior surface of said body.

14. The apparatus of claim 13, wherein said anchoring means is a generally continuous protrusion that extends substantially orthogonally from said exterior surface of said body.

15. The apparatus of claim 1, wherein said body comprises a one-piece structure.

16. The apparatus of claim 1, wherein said body is expandable into multiple locked positions.

17. An apparatus for exerting an outwardly, radially directed force on an inner surface of a gasket to compress said gasket into sealing engagement with a wall of an opening, comprising:
   a one-piece strip of resiliently flexible material having a uniform width and a substantially continuous and uninterrupted flat exterior circumferential surface, said strip having first and second ends, said first end overlapping said second end;
   means integrally molded on said strip for cooperating with force exerting means for moving said strip to one of a plurality of expanded positions, said flat exterior surface of said strip exerting a substantially uniform, radially directed force on the inner surface of the gasket in each of said expanded positions; and
   means integrally molded on said strip and extending across the width thereof for locking said strip in each of said expanded positions.

18. The ring of claim 17, wherein said strip is made of plastic.

19. The ring of claim 17, wherein said first end of said strip and a portion adjacent thereto are tapered to a featheredge so as to provide said substantially continuous and uninterrupted exterior circumferential surface when said first end overlaps said second end.

20. The ring of claim 17, wherein said cooperating means comprises one or more lugs on a surface of said strip.

21. The ring of claim 20, wherein said one or more lugs are on an interior surface of said strip.

22. The ring of claim 20, wherein said cooperating means further comprises means on said second end of said strip for holding a portion of said force exerting means during movement of said ring to said expanded position.

23. The ring of claim 22, wherein said holding means is a recess formed in said second end.

24. The ring of claim 17, wherein said locking means comprises projections on an interior portion of said strip and projections on an exterior portion adjacent said second end that engage one another.

25. The ring of claim 24, wherein both of said projections are teeth-like structure.

26. The ring of claim 25, wherein said teeth-like projections on said interior portion are angled in a first direction and said teeth-like projections on said exterior portion adjacent said second end are angled in a second direction opposite said first direction.

27. The ring of claim 25, wherein a portion of said projections on said exterior portion adjacent said second end decrease in height in a direction away from said second end.

28. The ring of claim 25, wherein said first end of said strip and a portion adjacent thereto taper to a featheredge so as to provide said substantially continuous and uninterrupted circumferential surface and wherein a portion of said projections on said interior portion increase in height in a direction away from said first end until reaching a substantially constant height past said feathered portion adjacent the first end so as to provide strength reinforcement to said feathered portion of said strip when said first end overlaps said second end.

29. The ring of claim 17, wherein said guide means comprises at least two opposing tabs on an exterior surface of said strip.

30. The ring of claim 17, further comprising anchoring means for securing said ring against lateral movement in said gasket.

31. The ring of claim 30, wherein said anchoring means circumferentially extends around at least a portion of an exterior surface of said strip.

32. The ring of claim 31, wherein said anchoring means is a generally continuous protrusion that extends substantially orthogonally from said exterior surface of said ring.

33. An apparatus for radially compressing a gasket into sealing engagement with a wall of an opening, comprising:
   a one-piece strip having a uniform width and being formed into a ring, having a flat exterior circumferential surface;
   means on said strip for cooperating with force exerting means for moving said ring to an expanded position; and
   means on said strip and extending across the width thereof for locking said ring in said expanded position and for supporting said strip so that the flat exterior circumferential surface of the ring adjacent the gasket exerts a substantially uniform, radially directed force on an entire inner surface of the gasket.

34. The apparatus of claim 33, wherein said strip is made of plastic.

35. The apparatus of claim 33, further comprising anchoring means on an exterior surface of said strip adjacent said second edge for securing said ring against lateral movement in said gasket, said anchoring means circumferentially extending around at least a portion of said exterior surface of said strip.

36. The apparatus of claim 35, wherein said anchoring means is a generally continuous protrusion that extends substantially orthogonally from said exterior surface of said strip.

37. The apparatus of claim 33, wherein a first end of said strip and a portion adjacent thereto taper to a featheredge so as to provide said substantially continuous and uninterrupted exterior circumferential surface.

38. The apparatus of claim 33, wherein said ring is expandable into multiple locked positions.

39. A compression ring for exerting an outwardly, radially directed force on an inner surface of a gasket to compress said gasket into sealing engagement with a wall of an opening, comprising:

a one-piece strip of resiliently flexible material having a substantially continuous and uninterrupted exterior circumferential surface so that said ring exerts a generally uniform pressure on an inner surface of said gasket, said strip having first and second ends, said first end overlapping said second end when said strip is formed into said ring;

means integrally molded on said strip for cooperating with force exerting means for moving said ring to an expanded position;

means integrally molded with said strip for locking said ring in said expanded position;

means for guiding said first end over said second end during expansion of said ring so as to limit lateral movement of the first and second ends relative to one another;

wherein said locking means comprises projections on an interior portion of said strip and projections on an exterior portion adjacent said second end that engage one another;

wherein both of said projections are teeth-like structure; and wherein a portion of said projections on said exterior portion adjacent said second end decrease in height in a direction away from said second end.

40. A compression ring for exerting an outwardly, radially directed force on an inner surface of a gasket to compress said gasket into sealing engagement with a wall of an opening, comprising:

a one-piece strip of resiliently flexible material having a substantially continuous and uninterrupted exterior circumferential surface so that said ring exerts a generally uniform pressure on an inner surface of said gasket, said strip having first and second ends, said first end overlapping said second end when said strip is formed into said ring;

means integrally molded on said strip for cooperating with force exerting means for moving said ring to an expanded position;

means integrally molded with said strip for locking said ring in said expanded position;

means for guiding said first end over said second end during expansion of said ring so as to limit lateral movement of the first and second ends relative to one another;

wherein said locking means comprises projections on an interior portion of said strip and projections on an exterior portion adjacent said second end that engage one another;

wherein both of said projections are teeth-like structure; and wherein said first end of said strip and a portion adjacent thereto taper to a featheredge so as to provide said substantially continuous and uninterrupted circumferential surface and wherein a portion of said projections on said interior portion increase in height in a direction away from said first end until reaching a substantially constant height past said feathered portion adjacent the first end so as to provide strength reinforcement to said feathered portion of said strip when said first end overlaps said second end.

41. An apparatus for compressing a gasket into sealing engagement with a wall of an opening, comprising:

a strip having a uniform width, a flat exterior circumferential surface and first and second ends, the first end overlapping the second end; and means integrally molded with the strip and extending across the width thereof for locking the strip in a plurality of expanded positions, the locking means supporting the first and second overlapping ends so that the flat exterior circumferential surface exerts a substantially constant pressure on an inner surface of the gasket for any degree of radian measure along the strip in each expanded position.

42. The apparatus of claim 41, wherein the first end tapers to a featheredge.

43. The apparatus of claim 41, wherein the strip is integrally molded from plastic.

44. A compression ring for exerting an outwardly, radially directed force on an inner surface of a gasket to compress said gasket into sealing engagement with a wall of an opening, comprising:

a one-piece strip of resiliently flexible material having a ring shape with a substantially continuous and uninterrupted exterior circumferential surface of substantially constant surface area around a circumferential length of the strip, the exterior surface of the strip being formed to lie adjacent the inner surface of the gasket so that said exterior surface exerts a generally uniform pressure on the inner surface of said gasket when the strip is expanded, said strip having first and second ends, said first end overlapping and lying adjacent the exterior surface of the strip in the vicinity of said second end when said strip is formed into said ring shape;

means integrally molded on said strip for cooperating with force exerting means for moving said strip to an expanded position;

means integrally molded on said strip for locking said strip in said expanded position; and means for guiding said first end over said second end during expansion of said strip so as to limit lateral movement of the first and second ends relative to one another;

wherein said locking means comprises projections on an interior portion of said strip and projections on an exterior portion adjacent said second end that engage one another;

wherein both of said projections are teeth-like structure; and wherein a portion of said projections on said exterior portion adjacent said second end decrease in height in a direction away from said second end.

45. A compression ring for exerting an outwardly, radially directed force on an inner surface of a gasket to compress said gasket into sealing engagement with a wall of an opening, comprising:

a one-piece strip of resiliently flexible material having a ring shape with a substantially continuous and uninterrupted exterior circumferential surface of substantially constant surface area around a circumferential length of the strip, the exterior surface of the strip being formed to lie adjacent the inner surface of the gasket so that said exterior surface exerts a generally uniform pressure on the inner surface of said gasket when the strip is expanded, said strip having first and second ends, said first end overlapping and lying adjacent the exterior surface of the strip in the vicinity of said second end when said strip is formed into said ring shape;

means integrally molded on said strip for cooperating with force exerting means for moving said strip to an expanded position;

means integrally molded on said strip for locking said strip in said expanded position; and means for guiding said first end over said second end during expansion of said strip so as to limit lateral movement of the first and second ends relative to one another;

wherein said locking means comprises projections on an interior portion of said strip and projections on an exterior portion adjacent said second end that engage one another;

wherein both of said projections are teeth-like structure; and wherein said first end of said strip and a portion adjacent thereto taper to a featheredge so as to provide said substantially continuous and uninterrupted circumferential surface and wherein a portion of said projections on said interior portion increase in height in a direction away from said first end until reaching a substantially constant height past said feathered portion adjacent the first end so as to provide strength reinforcement to said feathered portion of said strip when said first end overlaps said second end.

* * * * *